Oct. 9, 1928.

G. N. ANTONOFF 1,687,051

ELECTRIC BATTERY OF THE LECLANCHÉ TYPE

Filed May 26, 1924   2 Sheets-Sheet 1

Inventor
G. N. Antonoff
By Marks & Clerk

Oct. 9, 1928.   1,687,051
G. N. ANTONOFF
ELECTRIC BATTERY OF THE LECLANCHÉ TYPE
Filed May 26, 1924   2 Sheets-Sheet 2
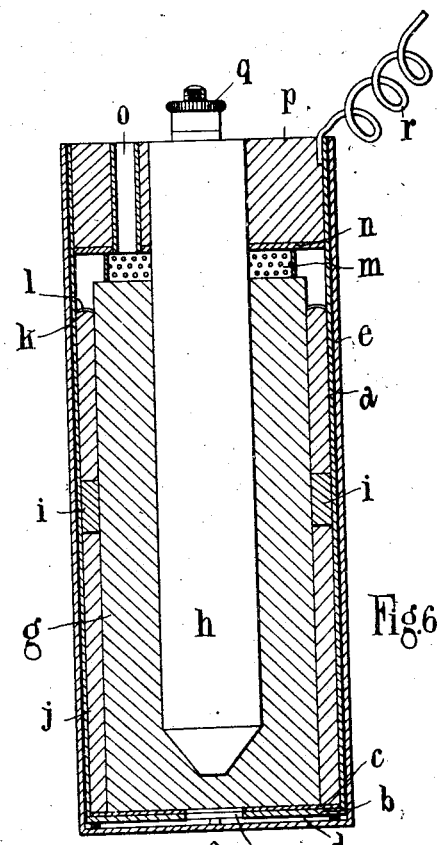
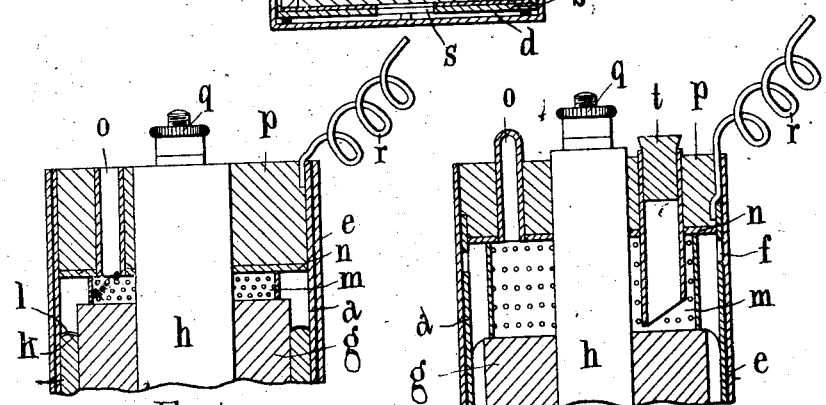
Inventor
G. N. Antonoff
By Marks & Clerk Patented Oct. 9, 1928.

1,687,051

UNITED STATES PATENT OFFICE.

GEORGE NICHOLAYEVICH ANTONOFF, OF LONDON, ENGLAND, ASSIGNOR TO MATTHEW ATKINSON ADAM, OF LONDON, ENGLAND.

ELECTRIC BATTERY OF THE LECLANCHÉ TYPE.

Application filed May 26, 1924, Serial No. 716,062; and in Great Britain June 8, 1923.

This invention relates to Leclanché cells in which zinc is used as the source of energy, and carbon is used for the positive pole with manganese dioxide as the depolarizer. In my British Patent No. 128,316 I have shown that the apparent density of the depolarizer is related to the internal resistance and how for given materials and conditions of working the best region of apparent density for output can be found. I have now found that certain other factors affect the result and also the obtaining of desired qualities of such cells, such as long life and maintenance of potential, economy of materials and space occupied for a given output. It has long been believed that ventilation of the depolarizer was advantageous, but although many proposals have been made to secure this, it is the common practice now where ventilation is used to provide a simple tubular vent through the sealing material which closes the zinc case so that the inside of the cell is in communication with the atmosphere through it while liquid is prevented from coming out. The zinc case is itself in practice enclosed in an internally waxed cardboard or other liquid-tight enclosure.

Now I have found that ventilation plays a further part than has been hitherto understood, and for this to be effective, first it is necessary for the exterior as well as the interior of the zinc case to be ventilated. Second, the jelly or like layer which is employed between the depolarizer and the zinc case should be produced in such a way as will avoid any liquefying and washing away or change of the depolarizer mass or the surface thereof, as is liable to occur when the unjellified liquid containing suspended starch is poured or otherwise introduced into the space between the depolarizer and the zinc case and the starch subsequently jellified. Such procedure is unsatisfactory with the low density depolarizers which I employ.

As far as I am aware no prior disclosure describes an electrolyte formation which will obtain the benefit arising from appropriate ventilation as described below. Ventilation externally and internally can only be fully effective by such an electrolyte, that is to say one which may not be porous at the commencement of the working of the cell but may then be of a gelatinous character, but during the effective life of the cell must change to a more porous character, becoming, say, of the texture of a cheese without liquefaction.

This invention in brief consists in an electric cell of the Leclanché type having an imperforate and preferably impervious outer case and a zinc container adapted to provide free communication between the inside and outside thereof with an electrolyte mixture gelatinous yet firm and substantially non-porous at the time of making but turning to a firm porous mass of the consistency of cheese without liquefaction.

In the accompanying drawings:—

Figure 5 represents part of a modification in which the sealing does not extend over the zinc container and the outer casing, the cell being first sealed and then inesrted into the casing.

Figure 6 represents a modified form of Figure 5 with the addition of a hole in the base of the zinc container;

Figure 7 illustrates part of an improved cell of the "immune" type sometimes known as the inert type, that is to say, a cell which has a dry electrolyte which upon addition of water assumes the desired consitency, thus becoming active for the purpose of operation as a so-called dry battery.

In carrying this invention into effect in one form by way of example as applied to a cell of 2¼" x 2¼" x 5½", I take a zinc case $a$ preferably of square tubular form and about 0.5 mm. thick or even less. The case should be sufficiently thick as not to become eaten away by the working of the cell for a considerable part of its life, say for the first half, but it is no detriment if it is sufficiently thin that after this it becomes porous and indeed this assists ventilation. This case either has a zinc bottom $b$ covered with an insulating layer $c$ or it may be open and the bottom formed by an impervious insulating cement such as hard bitumen composition. The zinc case is preferably coated with a thin layer of paraffin by dipping into melted paraffin.

A cardboard box $e$ fitting the outside of the zinc case is preferably impregnated with paraffin and when set the zinc case is inserted into the outer box. By using a proper compression of the depolarizer as indicated below and an outer casing well fitting the zinc case the best economy in material and space is achieved. The edges of the outer box $e$ project above the zinc case $a$ and the zinc is perforated near the top at $f$ so as to permit of external and internal ventilation of the zinc case, namely ventilation from the slight space outside the zinc case into the inside thereof.

Although this form of external and internal ventilation—that is, from the outside of the zinc to the inside—may be used by itself by way of perforations, such as those marked $f$, or by way of the single perforation $s$ in the bottom of the cell referred to below, or by way of both $f$ and $s$ it is more beneficial to provide in addition a vent in the top of the cell, such as $o$, described later.

The circulation permitted by way of a vent can be obtained whether the vent is formed at the top or at the bottom of the cell. I prefer the former for practical reasons because if at the bottom unless suitably trapped the cell may exude liquid during the course of its operation.

In order to minimize or prevent leakage of liquid in appreciable quantities during the working of the cell which, for example, might hinder ventilation by closing the passages $f$, it is preferred to use only a limited quantity of liquid in the manufacture of the cell. In any particular construction should it be found that liquid is likely to become free it is preferred to provide a space indicated by $d$ in Figure 1 between the bottom of the zinc and the cardboard case so that this can receive the liquid.

In any case the outer container should be moisture-retaining, so that even after the zinc has become perforated by the action of the cell external leakage is prevented by the outer case.

Figures 1, 3:
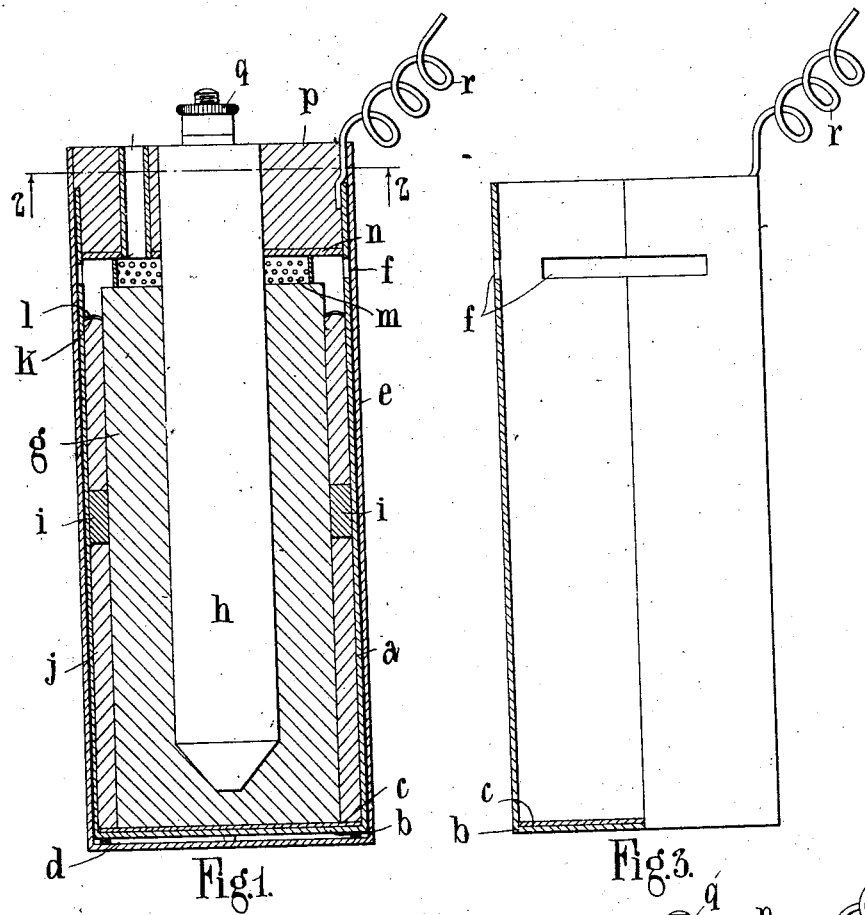
Figure 1 is a sectional elevation of a cell constructed according to one form of the present invention.
Figure 3 shows separately the zinc container of Figure 1 in the direction at right angles to that figure.
Figure 2:
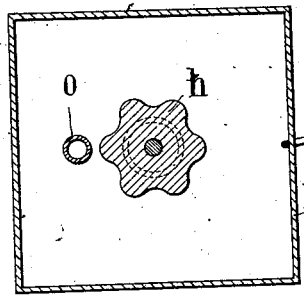
Figure 2 is a section on the line 2—2 of Figure 1 looking in the direction of the arrows.

The ventilating perforations $f$ may be in the form of holes or preferably slots, for example as shown clearly in Figure 3.

The depolarizer is made by moulding under pressure around a central carbon pole in the usual way, but the pressure of moulding should be such as will give to the compressed mass or dolly an apparent density between about 1.3 and 1.8 and preferably about 1.5. By "apparent density" I mean the ratio of the mass of the mixture of manganese dioxide and graphite (dry and without salts) in grammes to the volume to which it is compressed in c. c. (excluding the carbon rod). The actual pressure varies with the materials used in the mixture mass, i. e. the character and grade of the graphite and manganese dioxide and the content of liquid. The proportions of these are preferably 3 parts by weight of manganese dioxide to 2 parts of graphite, say Acheson B. B. 1, and 1 part of a solution containing about 5 per cent zinc chloride, 22 per cent ammonium chloride and 73 per cent water.

The dolly or depolarizer $g$ thus formed with the carbon pole $h$ is then wrapped in an open fabric such as muslin and has suitable spacing pieces $i$ tied on externally. It is then placed centrally into the zinc case $a$ with its insulated bottom, into which has been placed the required amount of the above solution containing about 3 to 5 per cent of a starch gel and preferably with 15 per cent to 20 per cent ungelatinized starch granules suspended in it. The dolly thus displaces the filling into an annulus surrounding it. The zinc case $a$ is then heated to convert the remainder of the starch into gel form, the free surface $k$ of the gel being a little lower than the height of the depolarizer.

This mixture when made is substantially of a gelatinous nature but changes after a period to a spongy consistency of the nature of cheese, becoming firm yet porous. It does not liquefy during the working of the cell.

A slight layer of paraffin wax $l$ is then introduced on the top of the filling to seal the latter more or less. A perforated ring of celluloid or the like $m$ is then placed on the top of the dolly near its edge and a cardboard washer $n$ is placed on this ring extending to and closing the zinc case $a$ above the perforations $f$. The cardboard washer carries one or more tubular vents of glass $o$ of suitable size, say 4 mm. diameter. The zinc case $a$ is then placed into the cardboard outer case $e$. The sealing mixture $p$ of the cell, preferably bitumen and a filling agent, is then introduced to fill up to the edge of the cardboard outer case and the edges of the vent or vents. The cell is thus completed, connections $q$ and $r$ having been made to the carbon and zinc previously.

Owing to the perforations $f$ in the zinc case and in the celluloid ring $m$, the outer surface of the zinc case is in free communication with the top of the dolly $g$.

Figure 4:
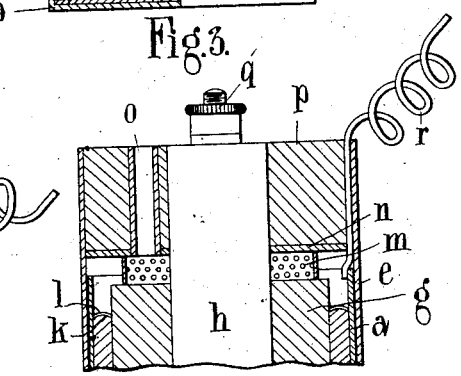
Figure 4 shows in elevation a modification in which a shorter form of zinc container is employed.

Instead of carrying the zinc case into the top seal, in some cases provision may be made for its being otherwise held in place and located in relation to the carbon and the case in such a way that free ventilation may take place over its upper edge. Such an arrangement in one form is illustrated in Figure 4, the zinc container *a* terminating slightly above the depolarizer mass.

According to other modifications—not necessarily giving as good results—the zinc case may extend as high as the outer container and be sealed before insertion into the container as indicated, for instance, in Figure 5. The exterior of the zinc in this case is ventilated by the comparative looseness of fit in the container, the interior of the cell being open to atmosphere through the vent *o*.

Another form of this class of construction is indicated in Figure 6 in which a hole *s* is provided in the base of the zinc container *a* leading from the inside to the outside of the zinc. In this form the bitumen or like sealing may extend over the top of the zinc case as in Figure 1 or not.

A hole in this position may also be provided in a cell constructed as shown in Figure 1.

In preparing an improved cell of the so-called immune class, I only incorporate about half the salts required to form the electrolyte in the dolly and the other half I thoroughly dry and mix with thoroughly dried gelatinized starch preferably of tapioca or the like and fill this powder into the annulus between the dolly and the zinc case, completing the cell.

A layer of muslin or the like is provided to prevent the dry particles from falling out of the annulus during transport.

The zinc case may contain the same slots which in this case are covered with a layer of unabsorbent cotton wool or the like which prevents water from passing into the outside of the zinc case.

Alternatively, a hole in the bottom of the zinc case is made and a layer of unabsorbent cotton wool sealed into it so as to prevent leakage of the liquid.

Another form of cell of this character is shown in Figure 7, the various parts of which correspond substantially to the like parts in Figure 1, except that a filling tube *t* is preferably provided, the celluloid or the like ring *m* is deeper and the vent *o* is shown as closed, that is to say as it is provided for storage. The vent *o* is opened by breaking the end when the necessary charging liquid is introduced into the cell and then remains open.

The filling tube *t* is illustrated as having the lower end cut at an angle. If desired, it may be cut square and terminate flush with the washer *n*. In the latter case the space outside the zinc case is filled with water and must be emptied afterwards. Care should be taken that the water is not held there by capillary forces.

As in the former case the perforations *f* may be in the nature of holes or slots in one or two rows or a combination of holes and slots. In some cases they need not be provided.

A cell thus constructed does not deteriorate on keeping over long periods, even in hot climates, and on introducing the limited quantity of water required it becomes active and gives the cell a life not shorter than the normal.

In the case of the immune cell, whether ventilation be employed or not (and if ventilated whatever type of ventilation be employed) I have found that considerable advantages arise from the employment of a mixture of dry gelatinized starch or corresponding natural forms of starch, such as tapioca or the like, with dry ammonium chloride or the like in proportions approximately as follows:

|  | Grams. |
|---|---|
| Ammonium chloride | 100 |
| Tapioca or the like | 50 |

I have made a number of experiments and have found that if less tapioca or the like is used there is a tendency for the water on addition to wash out the depolarizer, particularly if it be made under a comparatively low pressure. If more tapioca or the like is used the mass is not sufficiently permeable to water so that the water does not at least for some considerable time reach the bottom of the cell, the soaking of the starch on the way preventing it.

If desired in any of the forms in place of holes or slots indentations or weak parts may be formed in the zinc casing which after the cell has functioned for a short time will be eaten away by the action of the current forming holes or slots.

Ventilation inside the cell may be ventilation inside the dolly or depolarizer mass or ventilation between the external surface of the dolly and the internal surface of the zinc.

In place of dried gelatinized starch for the immune cell referred to above other materials with which there is no liquefaction can be employed, for example natural forms of starch.

Tragacanth may also be used but in that case in order to enable the water to percolate throughout the mass of the tragacanth a greater quantity of salts is required than with gelatinized starch.

Cells as described above may be made of any suitable size and shape, for example the ordinary size as used for telephone work or smaller sizes such as are employed for torch lights or pocket lamps.

Other examples of electrolyte mixtures which are gelatinous yet firm, substantially non-porous at the time of making but turning to a firm porous mass of the consistency of cheese without liquefaction during the action of the cell are as follows:—

|   | Per cent (up to about 30° C.) |
|---|---|
| Agar-agar | 3.5 |
| Rice | 12.0 |
| Arrowroot | 13.0 |
| Maize | 13.0 |
| Wheat | 12.0 |

In contrast to these it may be noted that gelatine used by itself as an electrolyte filler even up to a strength as high as 33 per cent is not within the definition because liquefaction occurs during the working of the cell and with the salts necessarily employed.

According to the present invention for the making of "immune" cells there may be employed either gelatinized dry starch or a natural form of starch.

By natural starch is meant varieties of starch which swell or jellify on being brought into contact with cold water, for example tapioca and gum tragacanth as distinct from potato, rice and wheat starches.

Having now described my invention what I claim as new and desire to secure by Letters Patent is:—

1. An electric cell of the Leclanché type with an outer moisture-retaining case provided with free ventilation for the zinc electrode externally as well as internally and with an electrolyte mixture gelatinous yet firm and substantially non-porous at the time of making but turning to a firm porous mass of the consistency of cheese without liquefication.

2. A cell as claimed in claim 1, in which the apparent density of the depolarizer mass lies in the region of 1.3 to 1.8 and preferably about 1.5.

3. A cell as claimed in claim 1 in which ventilation is effected by establishing a communication between the inside and outside of the zinc case by means of slots near the top of the case and slots near the bottom of the case.

4. An electric cell as claimed in claim 1 with communication between the inside and the outside of the zinc case and a vent leading from the inside to atmosphere.

5. A cell as claimed in claim 1 with slots near the top of the zinc case, slots near the bottom of the zinc case and a vent leading from the inside of the zinc case near the top to the atmosphere.

6. A cell as claimed in claim 1 in which ventilation is effected by establishing a communication between the outside and inside of the zinc case near the top and near the bottom of the case, preferably by means of slots, 7. A cell as claimed in claim 1, in which ventilation is effected by establishing a communication between the inside and outside of the zinc case by means of slots near the top thereof.

8. A cell as claimed in claim 1, in which ventilation is effected by establishing a communication between the inside and outside of the zinc case by means of slots near the top thereof, and also by means of slots near the bottom thereof.

9. A cell as claimed in claim 1, in which ventilation is effected by establishing a communication between the inside and outside of the zinc case near the top and near the bottom thereof, the connection at the top being free for the passage of gases, that is unobstructed by any obstructing material.

10. A cell as claimed in claim 1, with slots near the bottom of the zinc case and a vent leading from the inside of the zinc case near the top to the atmosphere.

11. A cell as claimed in claim 1, in which ventilation is effected by establishing a communication between the outside and inside of the zinc case near the bottom of the case.

12. A cell as claimed in claim 1 in which ventilation is effected by establishing a communication between the outside and inside of the zinc case by means of slots near the bottom of the case.

13. An electric cell of the Leclanché type with an outer moisture retaining case, a zinc tubular electrode, provided with communications for the passage of gases from the inside to the outside of the electrode near the top and near the bottom of the electrode, a depolarizer mass, a carbon core, an electrolyte mixture gelatinous yet but firm, substantially non-porous at the time of making but turning to a firm porous mass of the consistency of cheese without liquefaction and containing at the time of making salts for the electrolyte, together with means for sealing the top of the cell.

14. A method of forming a dry cell which includes the steps of preparing a nearly liquid starch gel of low starch content suspending in this gel starch granules and completing the jellification of the mixture by heat.

15. An electric cell of the Leclanché type with an outer moisture retaining case provided with vents between the external atmosphere and the interior of the cell and vents between the zinc electrode and the interior of the cell together with an electrolyte mixture gelatinous yet firm and substantially non-porous at the time of making but turning to a firm porous mass of the consistency of cheese without liquefaction.

16. In combination, a zinc casing, a depolarizer mass within said zinc casing with a gap between the external periphery of the mass and the interial periphery of the casing, a liquid starch gel of low starch content in said gap and ungelatinized starch granules suspended in said starch gel.

17. An electric cell of the Leclanché type with an outer moisture-retaining case, a zinc tubular electrode provided with communications for the passage of gases from the inside to the outside of the electrode near the bottom of the electrode, a depolarizer mass, a carbon core, an electrolyte mixture gelatinized yet firm substantially non-porous at the time of making but turning to a firm porous mass of the consistency of cheese without liquefaction and containing at the time of making slots for the electrolyte together with means for sealing the top of the cell.

18. A cell of the "immune" type in which the space between the depolarizer and the tubular zinc electrode is filled with a mixture of finely divided natural starch and finely divided dry salts.

19. A cell of the "immune" type in which the space between the depolarizer and the tubular zinc electrode is filled with a mixture of tapioca and finely divided dry salts.

20. A cell of the "immune" type in which the space between the depolarizer and the tubular zinc electrode is filled with a mixture of finely divided tapioca and ammonium chloride.

21. A cell of the "immune" type in which the space between the depolarizer and the tubular zinc electrode is filled with a mixture of starch and dry salts and the cell is sealed from the atmosphere until it is required to be used.

22. A cell of the "immune" type in which a mixture of starch and dry salts are employed, the proportion between these substances being so chosen that the water when added does not wash away the depolarizer yet reaches the bottom of the cell.

23. A cell of the "immune" type containing the following substances in about the proportions specified, namely about 100 parts by weight of ammonium chloride to about 50 parts by weight of tapioca.

In testimony whereof I have signed my name to this specification.

GEORGE NICHOLAYEVICH ANTONOFF.